United States Patent
Sugita

[19]

[11] Patent Number: 6,092,148
[45] Date of Patent: Jul. 18, 2000

[54] MICROCOMPUTER HAVING DIFFERENT MEMORY CAPACITIES THAT CAN BE SELECTED FROM A COMMON CHIP LAYOUT

[75] Inventor: Kazuya Sugita, Tokyo, Japan

[73] Assignee: Mitsubishi Denki Kabushiki Kaisha, Tokyo, Japan

[21] Appl. No.: 08/962,328

[22] Filed: Oct. 31, 1997

[30] Foreign Application Priority Data

Jul. 17, 1997 [JP] Japan ................................ 9-192880

[51] Int. Cl.[7] .............................. G06F 9/44; G06F 15/78
[52] U.S. Cl. .......................... 711/102; 711/103; 711/104
[58] Field of Search .................................. 711/102, 103, 711/104; 712/224

[56] References Cited

U.S. PATENT DOCUMENTS

| | | | |
|---|---|---|---|
| 4,488,257 | 12/1984 | Hosaka ..................................... | 711/102 |
| 5,432,742 | 7/1995 | Ihara et al. .............................. | 365/104 |
| 5,467,457 | 11/1995 | Kohda et al. ........................... | 711/102 |
| 5,680,343 | 10/1997 | Kamaya .................................. | 365/104 |
| 5,835,398 | 11/1998 | Hirose .................................... | 365/104 |
| 5,893,927 | 5/1999 | Hovis ..................................... | 711/102 |
| 5,907,507 | 5/1999 | Watannabe et al. .................... | 365/104 |

FOREIGN PATENT DOCUMENTS

| | | |
|---|---|---|
| 62-151968 | 7/1987 | Japan . |
| 6-28495 | 4/1994 | Japan . |
| 7-302254 | 11/1995 | Japan . |

*Primary Examiner*—Eddie P. Chan
*Assistant Examiner*—Jan S. Williams, II
*Attorney, Agent, or Firm*—Burns, Doane, Swecker & Mathis, LLP

[57] ABSTRACT

In the manufacture of microcomputers, the output of either of two memory capacity select circuits is selected using a mask that is used for selecting data of a mask ROM, then the selected output is used to change the address space in which a built-in ROM is effective, and the space in which an external address corresponding to the storage capacity of the built-in ROM is effective is switched, whereby at least two kinds of storage capacities of the built-in memory and spaces in which external addresses corresponding thereto are effective can be selected.

10 Claims, 5 Drawing Sheets

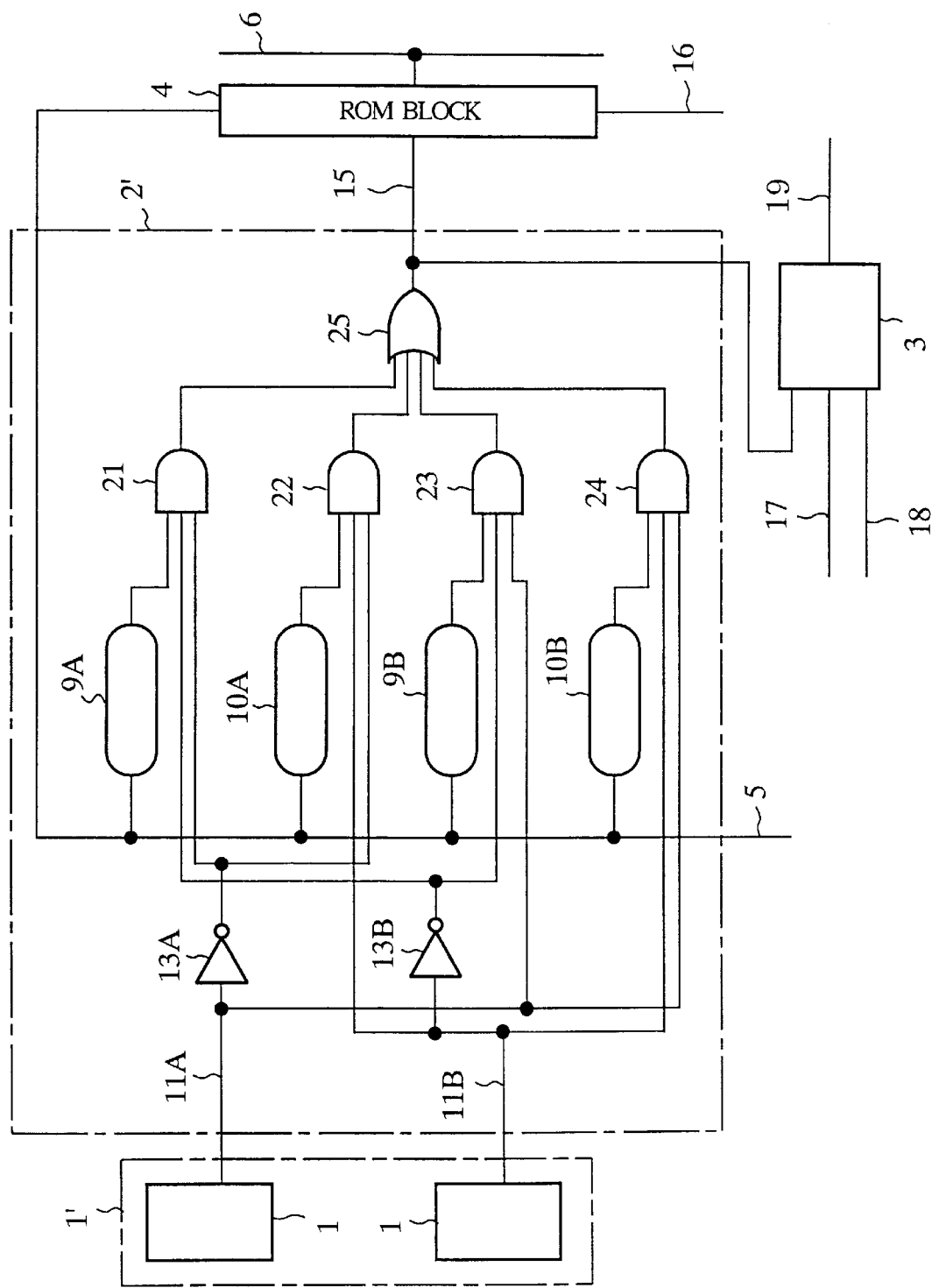

MICROCOMPUTER HAVING DIFFERENT MEMORY CAPACITIES THAT CAN BE SELECTED FROM A COMMON CHIP LAYOUT

BACKGROUND OF THE INVENTION

1. Field of the Invention

The present invention relates to a microcomputer with a RAM and a ROM.

2. Description of the Prior Art

Conventionally, in the development of plural models of microcomputers with different memory capacities, it is general practice to start designing the chip layout for each memory capacity at the beginning stage of work. On this account, an appreciable number of design engineers are required to roll out a product line of microcomputers with different memory capacities.

Furthermore, since characteristics of CPUs and peripheral circuits may sometimes differ a little due to a difference in the wire capacitance by different chip layouts, such characteristic differences need to be taken into account in the development of microcomputers.

In view of the above, there is now under study a method of developing plural models of microcomputers of different memory capacities from a common chip layout. FIGS. 8(A) and 8(B) show examples of memory maps in the case of using a chip of a 32-Kbyte ROM capacity as a chip of a 24-Kbyte ROM capacity, FIG. 8(A) being a memory map of the chip with a 32-Kbyte ROM capacity and FIG. 8(B) a memory map of the chip with a 24-Kbyte ROM capacity. In FIGS. 8(A) and 8(B), reference character D1 denotes a memory area for a register of a peripheral device, D2 a memory area for a RAM, D3 a memory area for a flash memory or similar external memory, D4 a memory area for a ROM and D5 an area that is not used.

Conventional microcomputers are configured as described above. For example, in the case of fabricating a chip of the 32-Kbyte ROM capacity as a chip of the 24 Kbyte ROM capacity as shown in FIGS. 8(A) and 8(B), the memory area D5 from an address "8000h" to "A000h" cannot be used because other hardware structures remain the same as in the case of the 32 Kbyte memory capacity; hence, the memory area D5 goes to waste.

SUMMARY OF THE INVENTION

It is therefore an object of the present invention is to provide microcomputers of different memory capacities that can be developed from a common chip layout and eliminates an unusable area on the memory map, thereby permitting reduction of the number of development engineers, removing characteristic differences between the memories of different capacities and increasing the efficiency of use of a bank.

To attain the above objective, according to a first aspect of the present invention, there is provided a microcomputer which comprises: a memory capacity select circuit made up of at least one pair of circuits whose outputs can be selected by a mask that is used in the selection of data of a mask ROM; a ROM area decode circuit for changing an address space in which a built-in ROM is effective, by the memory capacity select circuit; and an external area decode circuit for switching a space in which an external address corresponding to the memory capacity of the built-in ROM selected by the ROM area decode circuit is effective; and wherein at least two kinds of memory capacities of the built-in ROM and the spaces in which external addresses corresponding thereto are effective can be selected. With this configuration, plural kinds of microcomputers with memories of different storage capacities can be developed from one chip layout—this permits reduction of the number of development engineers and removal of characteristic differences between the memories. Furthermore, microcomputers of different memory capacities can be manufactured in the same manner to a step preceding a custom step in a wafer process; hence, the bank can be used with higher efficiency.

According to a second aspect of the present invention, there is provided a microcomputer which comprises: a memory capacity select circuit made up of at least one pair of circuits whose outputs can be selected by a mask that is used in the selection of data of a mask ROM; a RAM area decode circuit for changing an address space in which a built-in RAM is effective, by the memory capacity select circuit; and an external area decode circuit for switching a space in which an external address corresponding to the memory capacity of the built-in RAM selected by the RAM area decode circuit is effective; and wherein at least two kinds of memory capacities of the built-in RAM and the spaces in which external addresses corresponding thereto are effective can be selected. With this configuration, same effects as obtainable with the first aspect can be produced.

According to a third aspect of the present invention, there is provided a microcomputer which further comprises a memory capacity select register for storing memory capacity select data and wherein either one of the at least two kinds of memory capacities and the spaces in which the external addresses corresponding thereto are effective can be selected based on the memory capacity select data stored in the memory capacity select register. With this configuration, by forming a mask for only one of two types of microcomputers, the operation of the other type of microcomputer can also be checked.

According to a fourth aspect of the present invention, there is provided a microcomputer which further comprises an input terminal for receiving an external select signal and wherein a memory capacity and a space in which an external address corresponding thereto is effective can be selected in accordance with the select signal. With this configuration, it is possible to check the operation of every type of microcomputer by the input signal from the outside.

According to a fifth aspect of the present invention, there is provided a microcomputer wherein the select signal is input at timing close to that for turning OFF a reset signal for resetting a latch circuit that latches the select signal input from the input terminal. With this configuration, it is possible to provide increased safety or security against an accidental change in the input signal to the external terminal under the influence of noise or the like.

BRIEF DESCRIPTION OF THE DRAWINGS

Other objects and advantages of the present invention will be fully understood from the following detailed description taken in conjunction with the accompanying drawings, in which:

FIG. 3 is a circuit diagram illustrating part of the configuration of the microcomputer according to Embodiment 2 of the present invention;

DETAILED DESCRIPTION OF THE PREFERRED EMBODIMENTS

A detailed description will be given, with reference to he accompanying drawings, of preferred embodiments of the present invention.

Embodiment 1

Figure 1:
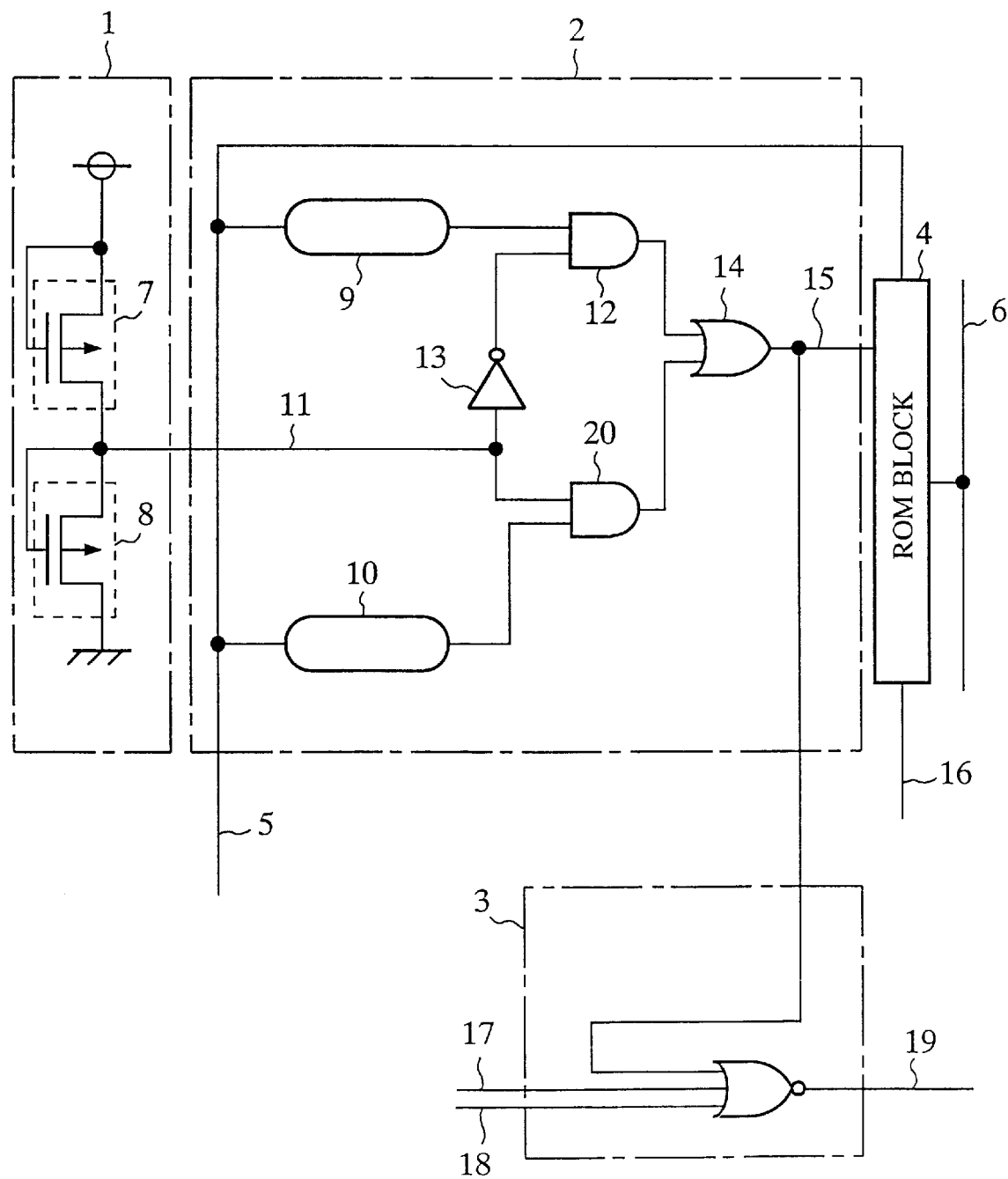
FIG. 1 is a circuit diagram illustrating part of the configuration of the microcomputer according to Embodiment 1 of the present invention.

FIG. 1 is a circuit diagram illustrating part of the configuration of the microcomputer according to Embodiment 1 of the present invention. In FIG. 1, reference numeral 1 denotes a memory capacity for selecting a memory capacity, 2 a ROM area decode circuit which decodes an address signal of a ROM area, which is an address area for a ROM, and outputs a ROM area access permission signal, 3 an external memory connectable area decode circuit (an external area decode circuit) for outputting an access permission signal to an external memory, 4 a ROM block containing a ROM and its peripheral circuits), 5 an address bus, and 6 a data bus.

Figure 8A:
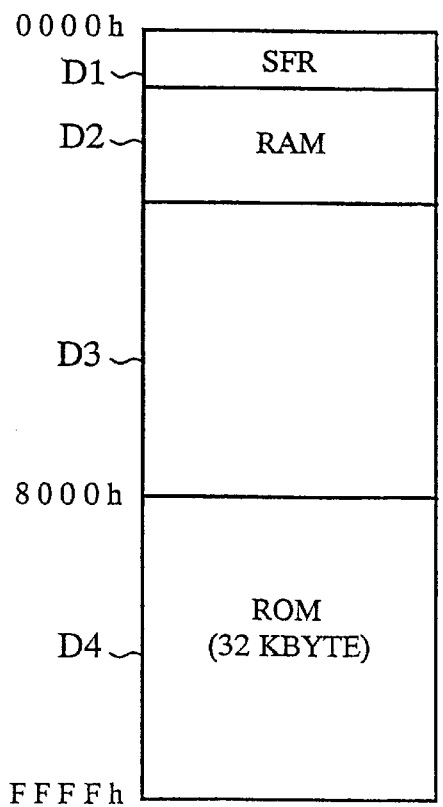
FIGS. 8(A) and 8(B) are diagrams showing an example of memory map in the case of using a chip of a 32-Kbyte ROM capacity as a chip of a 24-Kbyte ROM capacity.
Figure 8B:
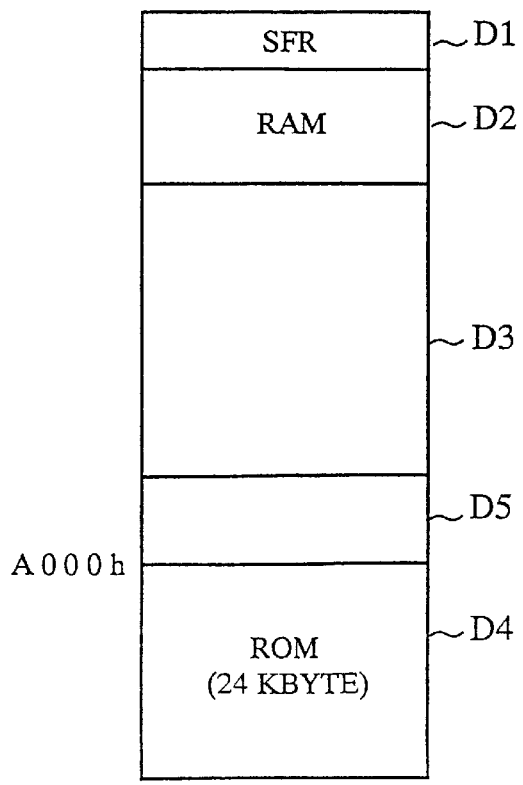

Reference numerals 7 and 8 denote P-channel transistors, which are totem-pole-connected. Reference numerals 9 and 10 denote decode circuits which decode address data and, when the ROM area is designated, output high-level (hereinafter referred to H-level) signals, decode circuits 9 and 10 having their input terminals connected to the address bus 5. The decode circuit 9 outputs the H-level signal when the address data indicates an address in an address area A (for example, an address area from "8000h" to "FFFFh" in FIG. 8(A)) in the case of the ROM area being 32-Kbyte, for instance. The decode circuit 10 outputs the H-level signal when the address data indicates an address in an address area B (for example, an address area from "A000h" to "FFFFh" in FIG. 8(A)) in the case of the ROM area being 24-Kbyte, for instance.

Reference numeral 11 denotes a signal line for transmitting a memory capacity select signal, 12 and 20 AND circuits, 13 a NOT circuit and 15 a signal for transmitting a ROM area decode signal. The signal line 11 is connected at one end to the connection point of the totem-pole connection of the P-channel transistors 7 and 8 and at the other end to the input terminal of the NOT circuit 13 and the one input terminal of the AND circuit 20. The NOT circuit 13 has its output terminal connected to the one input terminal of the AND circuit 12 and the AND circuits 12 and 20 has their other input terminals connected to the output terminals of the decode circuits 9 and 10, respectively. The output terminals of the AND circuit 12 and 20 are each connected to one of two input terminals of an OR circuit 14, whose output terminal is connected to one end of the signal line 15, which is connected at the other end to an enable terminal of the ROM and a first input terminal of the external memory connectable area decode circuit 3.

Reference numeral 16 denotes a signal line for transmitting a readout control signal which controls an operation of reading out data from the ROM, the signal line 16 being connected at one end to a ROM readout control terminal and at the other end to a control bus (not shown). Reference numeral 17 denotes a signal line over which is transmitted a RAM area decode signal which is H-level when the address signal designates an address in the RAM area, the signal line 17 being connected to a second input terminal of the external memory connectable area decode circuit 3. Reference numeral 18 denotes a signal line over which decode signals of registers of peripheral circuits are sent, the signal line 18 being connected to a third input terminal of the external memory connectable area decode circuit 3. Reference numeral 19 denotes a signal line over which an external memory connectable area decode signal is sent, the signal line being connected at one end to the output terminal of the external memory connectable area decode circuit 3 and at the other end to a control bus (not shown).

Next, the operation of this embodiment will be described.

Embodiment 1 will be described as being applied to selective fabrication of a microcomputer of a 32-Kbyte ROM capacity (which microcomputer will hereinafter be referred to as an "M4 type microcomputer") and a microcomputer of a 24-Kbyte ROM capacity (which microcomputer will hereinafter be referred to as an "M3 type microcomputer") from the same chip.

In the case of fabricating the M4 type microcomputer, the memory capacity select signal on the signal line is made L-level by depleting the P-channel transistor 8 as by implantation of phosphorus through a mask in a channel cutting ROM process. In the case of manufacturing the M3 type microcomputer, the p-channel transistor 7 is similarly depleted to make the memory capacity select signal H-level.

In the case of the M4 type microcomputer, since the capacity select signal input into the ROM area decode circuit 2 is L-level, the AND circuit 12 functions as an effective gate, which permits the passage therethrough of a decode signal from the decode circuit 9 for output to the ROM block 4 and the external memory connectable area decode circuit 3 via the OR circuit 14. In the case of the M3 type microcomputer, the input capacity select signal is H-level and the AND circuit 20 functions as an effective gate, which permits the passage therethrough of a decode gate from the decode circuit 10 for output to the ROM block 4 and the external memory connectable area decode circuit 3.

Figure 2:
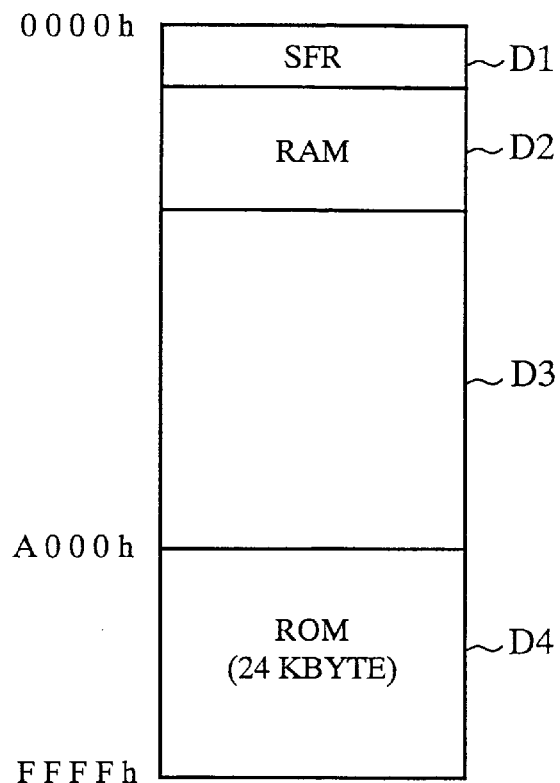
FIG. 2 is a diagram showing an example of a memory map of the microcomputer depicted in FIG. 1.

As a result, only when address data on the address bus 5 designates an address in the address area (address area A or B) of the M4 or M3 type microcomputer selected by the memory capacity select circuit 1, the ROM area decode signal goes H-level but remains L-level when other addresses are designated. Hence, for example, in the case of the M3 type microcomputer being selected, only when the address data designates an address in the address area B, the ROM area decode signal on the signal line 15 goes H-level, making the ROM block 4 operable, while at the same time an external memory connectable area decode signal goes L-level, inhibiting an access to an external memory. That is, in the case of the M3 type microcomputer being selected, when the address data designates an address outside the address area B, the ROM area decode signal goes L-level and, at this time, if the address data does not designate an address in any one of the RAM area and areas of registers of peripheral devices, that is, when a Ram area decode signal and a decode signal of the register group of the peripheral device on the signal lines 17 and 18 are both L-level, the external memory connectable area decode signal on the signal line 19 goes H-level, permitting this microcomputer to access an external memory via an I/O part not shown. In consequence, as shown in the memory map of FIG. 2, an area except a memory area D1 for the register of the peripheral device, a memory area D2 for RAM and a memory area D4 for ROM can be used as a memory area D3 for the external memory such as a flash memory. Thus, the memory area can be used effectively.

The ROM block 4 is read out and data, which is stored therein at the address designated by the address data when the ROM area decode signal on the signal line 15 is H-level, is output onto the data bus 6 when the readout control signal on the signal line 16 is H-level.

Incidentally, it is needless to say that a memory of a maximum storage capacity (32 Kbyte in this embodiment) desired to select, a decode circuit and so on are preincorporated in the ROM block 4. Moreover, Embodiment 1 has been described to employ the channel cut ROM (by implantation of phosphorus or the like) for selecting data of the mask ROM, but in the cases of other types of ROMs such as a contact ROM and aluminum option ROM, too, the same results as those mentioned above could be obtained by constructing the memory capacity select circuit 1 so that the H and L levels of the memory capacity select signal can be selected in the ROM data selecting step.

Besides, Embodiment 1 has been described to develop plural kinds of memories based on the ROM storage capacity, but of course, provision may be made to develop plural kinds of memories from the same chip layout based on different RAM storage capacities. In such an instance, the ROM area decode circuit 2 and the ROM block 4 in FIG. 1 are substituted with a RAM area decode circuit and a RAM block, respectively, and a RAM area decode signal is transmitted over the signal line 15 in place of the ROM area decode signal and a ROM area decode signal is transmitted over the signal line 17 in place of the RAM area decode signal.

In this case, provision is made to switch between a microcomputer of, for example, a 2-Kbyte RAM capacity (addresses from 1000h to 13FFh on the memory map, for instance) (which computer will hereinafter be referred to as a "R2 type microcomputer") and a 1-Kbyte (addresses 1000h to 11FFh on the memory map, for instance) (which microcomputer will hereinafter be referred to as a "R1 type microcomputer") on the same chip. Incidentally, it is needless to say that a memory of a capacity larger than a maximum one (2 Kbytes in this example) desired to select, a decode circuit and so on are preincorporated in the RAM block.

As described above, Embodiment 1 permits full utilization of all addresses on the memory simply by designating the capacity with the memory capacity select circuit 1, making it possible to simultaneously develop plural kinds of memories of different capacities from a common chip layout. This leads to reduction of the number of development engineers and elimination of characteristic differences among the plural kinds of memories. Additionally, such plural kinds of memories of different capacities can be fabricated in the same manner to a step preceding a custom step in a wafer process (to a step preceding the channel cut ROM step)—this produces an effect of increasing the efficiency of use of the bank.

Embodiment 2

FIG. 3 is a circuit diagram showing part of the configuration of the microcomputer according to Embodiment 2 of the present invention. In FIG. 3, reference numeral 1' denotes a memory capacity select circuit provided with a pair of memory capacity select circuits depicted in FIG. 1, 2' a ROM area decode circuit, 9A a decode circuit that outputs an H-level signal when supplied with address data indicating an address area A, 9B a decode circuit that outputs an H-level signal when supplied with address data indicating an address area C (an address space with addresses "C000h to FFFFh," for instance), 10A a decode circuit that outputs an H-level signal when supplied with address data indicating an address area B, 10B a decode circuit that outputs an H-level signal when supplied with address data indicating an address area D (an address space with addresses "E000h to FFFFh," for instance), 11A a signal line over which is transmitted a memory capacity select signal A that is output from the first memory capacity select circuit 1, 11B a signal line over which is transmitted a memory capacity select signal B that is output from the second memory capacity select circuit 1, 13A and 13B NOT circuits, 21 to 24 3-input AND circuits and 25 a 4-input OR circuit.

The signal lines 11A and 11B are connected at one end to the connection point of a totem-pole connection of two P-channel transistors forming the first and second memory capacity select circuits 1, respectively, the other end of the signal line 11A being connected to the input terminal of the NOT circuit 13A, a third input terminal of the AND circuit 23 and a third input terminal of the AND circuit 24 and the other end of the signal line 11B being connected to the input terminal of the NOT circuit 13B, a second input terminal of the AND circuit 22 and a second input terminal of the AND circuit 24.

The NOT circuit 13A has its output terminal connected to a third input terminals of the AND circuits 21 and the 22, and the NOT circuit 13B has its output terminal connected to second input terminals of the AND circuits 21 and 23. The decode circuits 9A, 10A, 9B and 10B have their input terminals connected to the address bus 5 and their output terminals connected to first input terminals of the AND circuits 21, 22, 23 and 24, respectively, which have their output terminals connected to first to fourth input terminals of the OR circuit 25, respectively, the output terminal of the OR circuit 25 being connected to one end of the signal line 15.

Next, the operation of this embodiment will be described.

Embodiment 1 is designed to selectively fabricate two kinds of microcomputers, such as those of a 32-Kbyte ROM capacity (M4 type) and a 24-Kbyte ROM capacity (M3 type), from the same chip. Embodiment 2 is adapted to fabricate from the same chip a total of four kinds of microcomputers including the above-mentioned two kinds of microcomputers plus a microcomputer of a 16-Kbyte ROM capacity (which computer will hereinafter be referred to as an "M2 type microcomputer") and a microcomputer of an 8-Kbyte ROM capacity (which microcomputer will hereinafter be referred to as an "M1 type microcomputer").

In the first place, the memory capacity select circuit 1' selects one of the four types of microcomputers M1 to M4 by selecting that one of the two P-channel transistors of each of the two memory capacity select circuits 1 which is to be depleted. For example, in the case of selecting the M4 type microcomputer, the P-channel transistor selected as mentioned above is depleted so that the memory capacity select signals on the signal lines 11A and 11B both go L-level; in the case of the M3 type microcomputer, the memory capacity select signals on the signal lines 11A and 11B are made L- and H-level, respectively; in the case of the M2 type microcomputer, the memory capacity select signals on the signal lines 11A and 11B are made H- and L-level, respectively; and in the case of the M1 type microcomputer, the memory capacity select signals on the signal lines 11A and 11B are both made H-level.

In the case of the M4 type microcomputer being selected, the ROM area decode circuit 2', the memory capacity select signals on the signal lines 11A and 11B in the ROM area decode circuit 2', which are output from the memory capacity select circuit 1', are both L-level. In this instance, only signals at the second and third input terminals of the AND circuit 21 go H-level and only the AND circuit 21 functions as an effective gate and permits the passage therethrough of a decode signal from the decode circuit 9A, which is output via the OR circuit 25 to the ROM block 4 and the external memory connectable area decode circuit 3.

Similarly, in the case of the M3 type microcomputer being selected, the memory capacity select signals on the signal lines 11A and 11B, which are provided from the memory capacity select circuit 1', both go H-level. In this instance, only signals at the second and third input terminals of the AND circuit 22 go H-level and only the AND circuit 22 functions as an effective gate and permits the passage therethrough of a decode signal from the decode circuit 10A, which is fed via the OR circuit 25 to the ROM block 4 and the external memory connectable area decode circuit 3.

In the case of the M2 type microcomputer being selected, the memory capacity select signals on the signal lines 11A and 11B, which are provided from the memory capacity select circuit 1', go H- and L-level, respectively. In this instance, only signals at the second and third input terminals of the AND circuit 23 go H-level and only the AND circuit 23 functions as an effective gate and permits the passage therethrough of a decode signal from the decode circuit 9B, which is fed via the OR circuit 25 to the ROM block 4 and the external memory connectable area decode circuit 3.

In the case of the M1 type microcomputer being selected, the memory capacity select signals on the signal lines 11A and 11B, which are provided from the memory capacity select circuit 1', both go H-level. In this instance, only signals at the second and third input terminals of the AND circuit 24 go H-level and only the AND circuit 24 functions as an effective gate and permits the passage therethrough of a decode signal from the decode circuit 10B, which is fed via the OR circuit 25 to the ROM block 4 and the external memory connectable area decode circuit 3.

Thus, only when the address data on the address bus 5 designates an address in the address area (address areas A to D) of the M4, M3, M2 or M1 type microcomputer selected by the memory capacity select circuit 1', the ROM area decode signal goes H-level and, when the address data designates other addresses, it goes L-level. For example, in the case of the M3 type microcomputer being selected, only when the address data designates an address in the address area B, the ROM area decode signal on the signal line 15 goes H-level, which makes the ROM block 4 operable and the external memory connectable area decode signal on the signal line 19 L-level, inhibiting an access to an external memory. That is, in the case of the M3 type microcomputer being selected, the ROM area decode signal goes L-level when the address data designates an address in any one of other address areas than that B, and if the designated address in this case is not in any one of the RAM area and areas of the register group of the peripheral device, that is, if the RAM area decode signal and the decode signal of the register group of the peripheral device on the signal lines 17 and 18 are both L-level, the external memory connectable area decode signal on the signal line 19 goes H-level, allowing this microcomputer to access an external memory via an I/O port not shown. As the result of this, a memory area except the those D1 for the register group of the peripheral device, D2 for RAM and D4 for ROM can be used as the memory area D3 for a flash memory or similar external memory; hence, all the memory areas can be used effectively. The same goes for the cases of selecting other M4, M2 and M1 microcomputers.

While Embodiment 2 has been described to selectively fabricate four types of microcomputers of different memory capacities, the memory capacities to be selected is not limited specifically to the four types and it is possible to selectively fabricate a desired number of microcomputers of different memory capacities by increasing the numbers of memory capacity select circuits and ROM area decode circuits.

As described above, Embodiment 2 produces, in addition to the effect of Embodiment 1, an effect that may kinds of microcomputers of different memory capacities can be developed from one chip layout.

Embodiment 3

Figure 4:
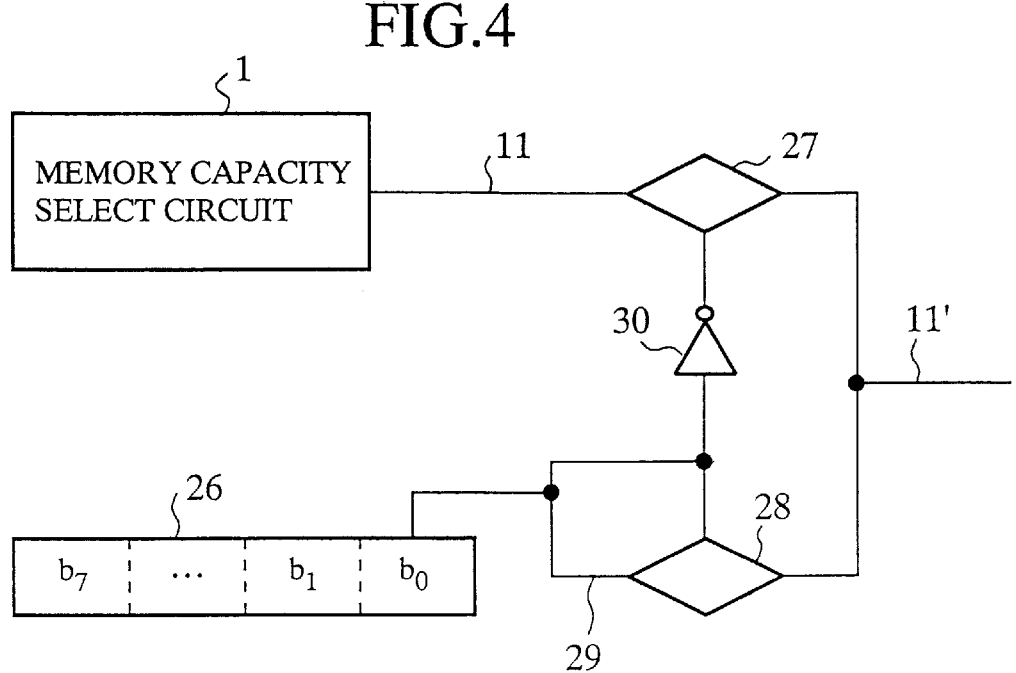
FIG. 4 is a circuit diagram showing a memory capacity select circuit and its associated circuit configuration in the microcomputer according to Embodiment 3 of the present invention.

FIG. 4 is a circuit diagram showing the memory capacity select circuit 1 and the circuit configuration associated therewith in Embodiment 3 of the present invention. In FIG. 4, reference numeral 11' denotes a signal line for transmitting a memory capacity select signal that can be set by software, 26 a memory capacity select register for storing memory capacity select signals, 27 and 28 switches, 29 a signal line for transmitting an out signal of a bit b0 of the memory capacity select register 26, and 30 a NOT circuit.

The signal line 29 is connected at one end to the bit b0 of the memory capacity select register 26 and at the other end to the one contact and a control terminal of the switch 28 and the input terminal of the NOT circuit 30. The other contact of the switch 28 is connected to one end of the signal line 11' and the output terminal of the NOT circuit 30 is connected to a control terminal of the switch 27. The switch 27 has its one contact connected to the signal line 11 and the other contact connected to the signal line 11'.

Next, the operation of this embodiment will be described.

In Embodiment 1, the memory capacity select signal on the signal line 11 is fixed at the H or L level by depleting the P-channel transistor 7 or 8 of the memory capacity select circuit 1 so as to switch the M4 and M3 type microcomputers one from the other.

In Embodiment 3, when the bit b0 of the memory capacity select register 26 is made H-level, the switch 28 turns ON and the switch 27 OFF, with the result that the software-settable memory capacity select signal on the signal line 11' goes H-level, irrespective of the memory capacity select signal on the signal line 11.

When the bit b0 of the memory capacity select register 26 is made L-level, the switch 27 turns ON and the switch 28 OFF, making the software-settable memory capacity select signal on the signal line 11' have any one of the levels selected by the memory capacity select circuit 1.

As described above, according to Embodiment 3, when it is necessary to check the operations of the M4 and M3 type microcomputers during their development, masks for both of them need not be produced but a mask for the M4 type is enough. With the mask for the M4 type, however, the memory capacity select signal on the signal line 11 is L-level as mentioned above, but simply by making the bit b0 of the memory capacity select register 20 H-level, the operation of the M3 type microcomputer can also be checked.

Since it is undesirable to consumers that the memory capacity is readily changed by the value of the bit b0, however, it is desirable to impose limitations on the write in the memory capacity select register 26, such as a requirement of two successive accesses thereto for write. Furthermore, although Embodiment 3 has been described to employ a method of forcibly fixing the memory capacity select signal on the signal line 11' at the H level, it is also possible to form a mask for the M3 type and fix the memory capacity select signal on the signal line 11' at the L level.

Embodiment 4

Figure 5:
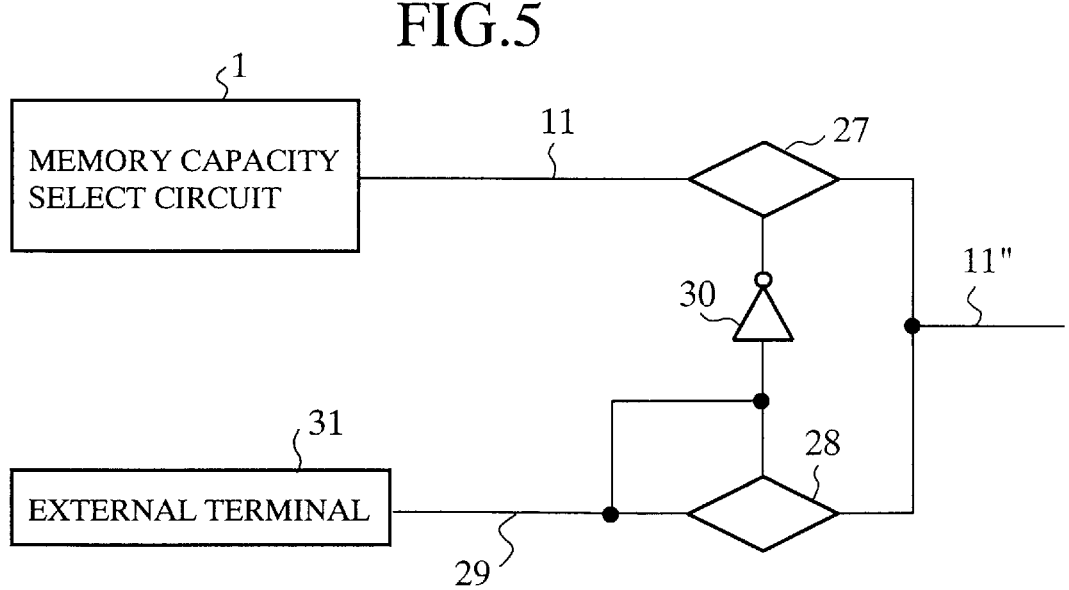
FIG. 5 is a circuit diagram showing a memory capacity select circuit and its associated circuit configuration in the microcomputer according to Embodiment 4 of the present invention.

FIG. 5 is a circuit diagram showing the memory capacity select circuit 1 and the circuit configuration associated therewith in Embodiment 4 of the present invention. In FIG. 4, reference numeral 11" denotes a signal line for transmitting a memory capacity select signal that can be set by an input signal (a select signal) from an external terminal (an input terminal), and 31 an external terminal, which is connected to the signal line 29.

Next, the operation of this embodiment will be described.

In Embodiment 3 the memory capacity select signal on the signal line 11' is forcibly fixed at the H level by the value of the bit b0 of the memory capacity select register 26, but in Embodiment 4, when an H-level signal is input from the external terminal 31, the memory capacity select signal on the signal line 11' becomes a signal of any one of the levels selected by the memory capacity select circuit 1.

As described above, Embodiment 4 produces an effect that the operation of the microcomputer of each type can be checked by an input signal from the outside.

In this case, however, there is the possibility of the input from the external terminal 31 undergoing an accidental change under the influence of noise or the like, but an unintentional variation of the memory capacity can be prevented by providing a plurality of external terminals and using the logical AND of input signals therefrom as the above-mentioned input, or by employing a three-input circuit capable of outputting three values.

Embodiment 5

Figure 6:
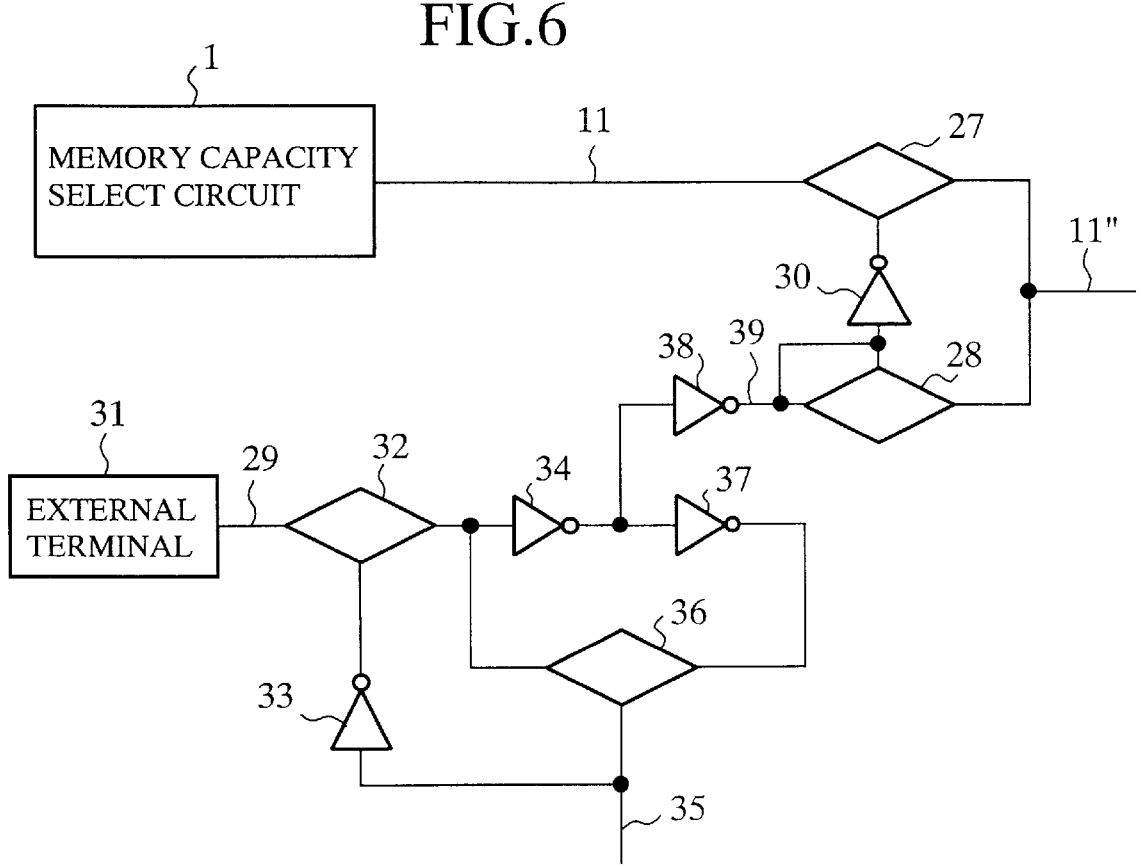
FIG. 6 is a circuit diagram showing a memory capacity select circuit and its associated circuit configuration in the microcomputer according to Embodiment 5 of the present invention.

FIG. 6 is a circuit diagram showing the memory capacity select circuit 1 and the circuit configuration associated therewith in Embodiment 5 of the present invention. In FIG. 6, reference numerals 32 and 36 denote switches, 33, 34, 37 and 38 NOT circuits, 35 a signal line for transmitting a reset signal, and 39 a signal line. The switch 32 has its one contact connected to one end of the signal line 29 and has the other contact connected to the input terminal of the NOT circuit 343 and the one terminal of the switch 36, and the switch 32 has its control terminal connected to the output terminal of the NOT circuit 33. The input terminal of the NOT circuit 33 is connected in parallel to the control terminal of the switch 36, which has its other contact connected to the output terminal of the NOT circuit 37. The output terminal of the NOT circuit 34 is connected to the input terminals of the NOT circuits 37 and 38. The output terminal of the NOT circuit 38 is connected to one end of the signal line 39, the other end of which is connected to the one contact of the switch 28. The NOT circuits 34, 37 and the switches 32 and 36 constitute a latch circuit.

Figure 7:
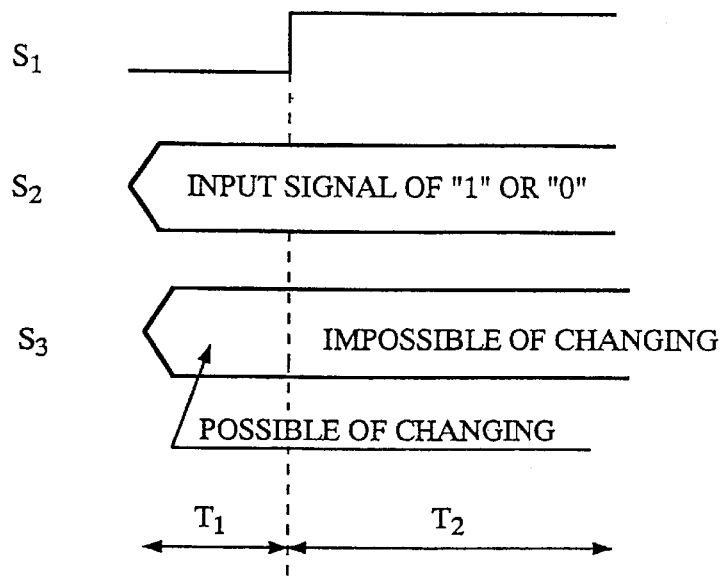
FIG. 7 is a timing chart showing the operation of Embodiment 5.

Turning now to the timing chart of FIG. 7, the operation of Embodiment 5 will be described.

In Embodiment 4 the input signal fed to the external terminal 31 is used directly as an input signal to the switch 28, but in Embodiment 5 the input signal applied to the external terminal 31 is input via the latch circuit to the switch 28.

In a period T1 during which a reset signal S1 on the signal line 35 is L-level, an input signal S2 fed to the external terminal 31 is provided intact onto the signal line 39 via the switch 32 and the NOT circuits 34 and 38 and sent to the switch 28. Incidentally, reference character S3 denotes a signal on the signal line 39.

When the reset signal S1 goes H-level in this state, the switch 32 turns OFF and the switch 36 ON, and in the subsequent period T2 the state of the input signal S2 provided from the external terminal 31 is latched in the latch circuit; hence, the signal S3 on the signal line 39 will not change even if the input signal S2 fed to the external terminal 31 changes.

As described above, Embodiment 5 provides increased safety or security even if the input signal to the external terminal 31 changes accidentally under the influence of noise or the like.

While in Embodiment 5 the period in which to make the latching of the signal S2 at the external terminal 31 effective or valid is provided by the timing of making the reset signal H-level, this timing needs only to be close to the timing for starting up the reset signal.

Incidentally, the embodiments described above are all adapted to operate on positive logic, but it is needless to say that they may be adapted to operate on negative logic.

While the preferred embodiments of the present invention have been described above, it must be construed that they are merely illustrative of the invention and that modifications and variations of the invention may be effected without departing from the scope of the spirits of the claims appended to this specification.

What is claimed is:

1. A microcomputer provided with a mask ROM, said microcomputer comprising:

a memory capacity select circuit for outputting a signal which selects data corresponding to address areas of said ROM to be effective;

a ROM area decode circuit for designating an address in an address area of said ROM which is selected to be effective by said memory capacity select circuit;

an external area decode circuit for permitting access to designated external memory address areas in relation to a storage capacity of said ROM which is selected to be effective;

wherein plural memory capacities of said built-in ROM and said designated external memory address areas corresponding thereto that are effective can be selected; and a memory capacity select register for storing memory capacity select data and wherein one of said plural memory capacities and said designate external memory address areas corresponding thereto that are effective can be selected based on said memory capacity select data stored in said memory capacity select register.

2. The microcomputer according to claim 1, which further comprises an input terminal for receiving an external select signal, and wherein a memory capacity and a designated external memory address area corresponding thereto that is effective can be selected in accordance with said select signal.

3. The microcomputer according to claim 3, wherein said select signal is input at timing close to that for turning OFF a reset signal for resetting a latch circuit that latches said select signal input from said input terminal.

4. A microcomputer provided with a mask RAM, said microcomputer comprising:

- a memory capacity select circuit for outputting a signal which selects data corresponding to address areas of said RAM to be effective;
- a RAM area decode circuit for designating an address in an address area of said RAM which is selected to be effective by said memory capacity select circuit;
- an external area decode circuit for permitting access to a designated external memory address areas in relation to a storage capacity of said RAM which is selected to be effective;
- wherein plural memory capacities of said built-in RAM and said designated external memory address areas corresponding thereto that are effective can be selected; and
- a memory capacity select register for storing memory capacity select data and wherein one of said plural memory capacities and said designate external memory address areas corresponding thereto that are effective can be selected based on said memory capacity select data stored in said memory capacity select register.

5. The microcomputer according to claim 4, which further comprises an input terminal for receiving an external select signal, and wherein a memory capacity and a designated external memory address area corresponding thereto that is effective can be selected in accordance with said select signal.

6. The microcomputer according to claim 5, wherein said select signal is input at timing close to that for turning OFF a reset signal for resetting a latch circuit that latches said select signal input from said input terminal.

7. The microcomputer according to claim 1, wherein said memory capacity select circuit comprises at least one pair of circuits whose outputs can be selected by a masking process.

8. The microcomputer according to claim 1, wherein said signal output by said memory capacity select circuit is selected by a masking process.

9. The microprocessor according to claim 4, wherein said memory capacity select circuit comprises at least one pair of circuits whose outputs can be selected by a masking process.

10. The microcomputer according to claim 4, wherein said signal output by said memory capacity select circuit is selected by a masking process.

* * * * *

UNITED STATES PATENT AND TRADEMARK OFFICE
CERTIFICATE OF CORRECTION

PATENT NO.    : 6,092,148
DATED         : July 18, 2000
INVENTOR(S)   : Kazuya SUGITA It is hereby certified that error appears in the above-identified patent and that said Letters Patent is hereby corrected as shown below:

Column 11, line 9, delete the word "mask", in accordance the Examiner's Amendment made of record February 14, 2000.

Signed and Sealed this

First Day of May, 2001

Attest:

NICHOLAS P. GODICI

Attesting Officer   Acting Director of the United States Patent and Trademark Office